US008623800B2

(12) United States Patent
Ooeda et al.

(10) Patent No.: US 8,623,800 B2
(45) Date of Patent: Jan. 7, 2014

(54) LUBRICANT SUITABLE FOR USE WITH MAGNETIC DISK

(75) Inventors: Yoshihiko Ooeda, Yokohama (JP); Masayuki Ishikawa, Ebina (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/188,423

(22) Filed: Jul. 21, 2011

(65) Prior Publication Data

US 2011/0281780 A1 Nov. 17, 2011

Related U.S. Application Data

(63) Continuation of application No. 12/313,409, filed on Nov. 19, 2008, now Pat. No. 8,007,932.

(30) Foreign Application Priority Data

Dec. 14, 2007 (JP) ................................. 2007-323382

(51) Int. Cl.
*C10M 107/34* (2006.01)
*C10M 107/38* (2006.01)

(52) U.S. Cl.
USPC .................... 508/582; 428/835.6; 428/835.7; 428/835.8

(58) Field of Classification Search
USPC ....................................................... 508/582
See application file for complete search history.

(56) References Cited

U.S. PATENT DOCUMENTS

| | | | | |
|---|---|---|---|---|
| 6,048,827 A * | 4/2000 | Fukuchi | ......................... | 508/582 |
| 6,461,998 B2 * | 10/2002 | Lenti et al. | .................... | 508/182 |
| 6,911,420 B2 * | 6/2005 | Osawa et al. | ................. | 508/111 |
| 7,038,068 B2 * | 5/2006 | Burns | ........................... | 549/504 |
| 7,247,605 B2 * | 7/2007 | Burns | ........................... | 508/307 |
| 7,510,999 B2 * | 3/2009 | Deng et al. | .................... | 508/422 |
| 7,534,750 B2 * | 5/2009 | Chiba et al. | ................... | 508/582 |

(Continued)

FOREIGN PATENT DOCUMENTS

| | | |
|---|---|---|
| JP | 2001-052328 | 2/2001 |
| JP | 2005-135501 | 5/2005 |
| JP | 2006-070173 | 3/2006 |

OTHER PUBLICATIONS

Non-Final Office Action Summary from U.S. Appl. No. 12/313,409 dated Dec. 23, 2010.

(Continued)

*Primary Examiner* — Ellen McAvoy
(74) *Attorney, Agent, or Firm* — Zilka-Kotab, PC

(57) ABSTRACT

A lubricant according to one embodiment includes a first ingredient and a second ingredient, said first ingredient as the main constituent being a first perfluoropolyether compound represented by the formula (1) which has a weight-average molecular weight of 500 to 6000 and a dispersity smaller than 1.3, and said second ingredient being a second perfluoropolyether compound which has a weight-average molecular weight of 500 to 6000 and has 6 to 10 hydroxyl groups (on average) in one molecule, $$\text{Rt-Rf}^1\text{-Rt} \quad (1)$$

where, $\text{Rf}^1$ denotes a perfluoropolyether chain represented by the formula (2) and Rt denotes a terminal group represented by the formula (3), $$-\text{CF}_2\text{O}-[(\text{CF}_2\text{CF}_2\text{O})_m-(\text{CF}_2\text{O})_n]-\text{CF}_2- \quad (2)$$

where, m and n each denote a natural number, $$-\text{CH}_2\text{OCH}_2\text{CHCH}_2\text{OH}. \quad (3)$$
$$\quad\quad\quad\quad\quad |$$
$$\quad\quad\quad\quad\quad \text{OH}$$

13 Claims, 2 Drawing Sheets

(56) References Cited

U.S. PATENT DOCUMENTS

| | | | |
|---|---|---|---|
| 7,670,695 B2* | 3/2010 | Wakabayashi et al. | 428/833.3 |
| 7,683,012 B2* | 3/2010 | Burns et al. | 508/110 |
| 7,943,558 B2* | 5/2011 | Burns et al. | 508/110 |
| 8,007,932 B2 | 8/2011 | Ooeda et al. | |
| 8,062,778 B2* | 11/2011 | Suzuki et al. | 428/835.8 |
| 8,178,480 B2* | 5/2012 | Hamakubo et al. | 508/582 |
| 8,188,323 B2* | 5/2012 | Leck et al. | 570/134 |
| 2005/0037932 A1* | 2/2005 | Liu et al. | 508/458 |
| 2005/0094316 A1 | 5/2005 | Shiramatsu et al. | |
| 2007/0225183 A1* | 9/2007 | Sasa et al. | 508/582 |
| 2008/0176106 A1* | 7/2008 | Guo et al. | 428/800 |
| 2010/0069275 A1* | 3/2010 | Marchionni et al. | 508/582 |
| 2010/0105584 A1* | 4/2010 | Avataneo et al. | 508/155 |
| 2010/0239887 A1* | 9/2010 | Kobayashi | 428/800 |

OTHER PUBLICATIONS

Notice of Allowance and Fee(s) Due from U.S. Appl. No. 12/313,409 dated Apr. 28, 2011.

* cited by examiner

| | Test for floating | | Test of self-restoration |
|---|---|---|---|
| | Sticking | Height of maximum convex (Å) | Restoration (%) |
| PFPE ( I ) | Yes | 2.4 | 62 |
| PFPE ( II ) | No | 1.0 | 75 |
| PFPE (III) | No | 1.2 | 56 |

| | PFPE ( I ) | PFPE ( II ) | PFPE (III) |
|---|---|---|---|
| Number of units suffering error | 0 | 3 | 0 |

LUBRICANT SUITABLE FOR USE WITH MAGNETIC DISK

CROSS-REFERENCE TO RELATED APPLICATIONS

This patent application is a continuation of U.S. patent application Ser. No. 12/313,409, filed Nov. 19, 2008, and also claims priority to Japanese Patent Appl. No. 2007-323382, filed Dec. 14, 2007, all of which are incorporated by reference in their entirety herein for all purposes.

BACKGROUND

There is a marked trend toward the higher recording density in the magnetic disk of the magnetic disk unit such as hard disk drive. An effective means of achieving the higher recording density is by decreasing equal to or below 10 nm the flying height of the magnetic head above the magnetic disk.

One way to achieve the extremely small flying height equal to or below 10 nm is by allowing the slider of the magnetic head to come into contact with the surface of the magnetic disk, thereby establishing the reference position, and then allowing the magnetic head to float as far as the flying height equal to or below 10 nm, as disclosed in Japanese Patent Laid-open No. 2005-135501 ("Patent Document 1").

The extremely small flying height equal to or below 10 nm poses serious problems in the case of the magnetic disk having a lubricating layer formed thereon. The problems involve the sticking to the magnetic head of the lubricant constituting the lubricating layer, the movement of the lubricant resulting from pressure between the magnetic head and the magnetic disk, and the inability of the lubricant to return to its original position after its movement on the surface of the magnetic disk.

In order to avoid the foregoing problems while achieving the flying height equal to or below 10 nm, it is necessary that the lubricating layer on the magnetic disk should have mutually contradictory characteristics—abhesion to the magnetic head, adequate flowability on the surface of the magnetic disk, and sufficient binding to the surface of the magnetic disk.

Unfortunately, any of conventional lubricating layers merely satisfies part of these requirements for abhesion, flowability, and binding. There exists no magnetic disk whose lubricating layer possess all of such characteristics.

BRIEF SUMMARY

A lubricant according to one embodiment includes a first ingredient and a second ingredient, said first ingredient as the main constituent being a first perfluoropolyether compound represented by the formula (1) which has a weight-average molecular weight of 500 to 6000 and a dispersity smaller than 1.3, and said second ingredient being a second perfluoropolyether compound which has a weight-average molecular weight of 500 to 6000 and has 6 to 10 hydroxyl groups (on average) in one molecule, $$Rt\text{-}Rf^1\text{-}Rt \quad (1)$$

where, $Rf^1$ denotes a perfluoropolyether chain represented by the formula (2) and Rt denotes a terminal group represented by the formula (3), $$(2) \quad -CF_2O-[(CF_2CF_2O)_m-(CF_2O)_n]-CF_2-$$

where, m and n each denote a natural number,

(3)

DETAILED DESCRIPTION OF THE INVENTION

Embodiments according to the present invention relate to a magnetic disk and a magnetic disk unit. More particularly, embodiments of the present invention relate to a magnetic disk having a lubricating layer formed on the surface thereof, and also to a magnetic disk unit provided therewith.

The following is a description of the magnetic disk and the magnetic disk unit according to embodiments of the present invention. The hard disk unit is assumed to be a hard disk drive. The embodiments given herein are not intended to restrict the scope of the present invention.

Embodiments of the present invention were completed in view of the foregoing. Embodiments of the present invention provide a magnetic disk having a lubricating layer formed on the surface thereof and also a magnetic disk unit provided therewith, the lubricating layer exhibiting the following characteristics—abhesion, adequate flowability, and binding ability.

According to one embodiment of the present invention, the magnetic disk has a magnetic layer, protective layer, and lubricating layer which are formed on a non-magnetic substrate, wherein the lubricating layer is composed of a lubricant containing a first ingredient and a second ingredient, the first ingredient as the main constituent being a first perfluoropolyether compound represented by the formula (1) which has a weight-average molecular weight of 500 to 6000 and a dispersity smaller than 1.3, and the second ingredient being a second perfluoropolyether compound which has a weight-average molecular weight of 500 to 6000 and has 6 to 10 hydroxyl groups (on average) in one molecule:

$$Rt\text{-}Rf^1\text{-}Rt \quad (1)$$

where, $Rf^1$ denotes a perfluoropolyether chain represented by the formula (2) and Rt denotes a terminal group represented by the formula (3):

$$(2) \quad -CF_2O-[(CF_2CF_2O)_m-(CF_2O)_n]-CF_2-$$

where, m and n each denote a natural number:

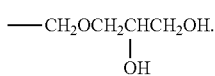
(3)

According to one embodiment of the present invention, the magnetic disk unit includes the magnetic disk mentioned above and a magnetic head to write and read information to and from the magnetic disk.

Figure 1:
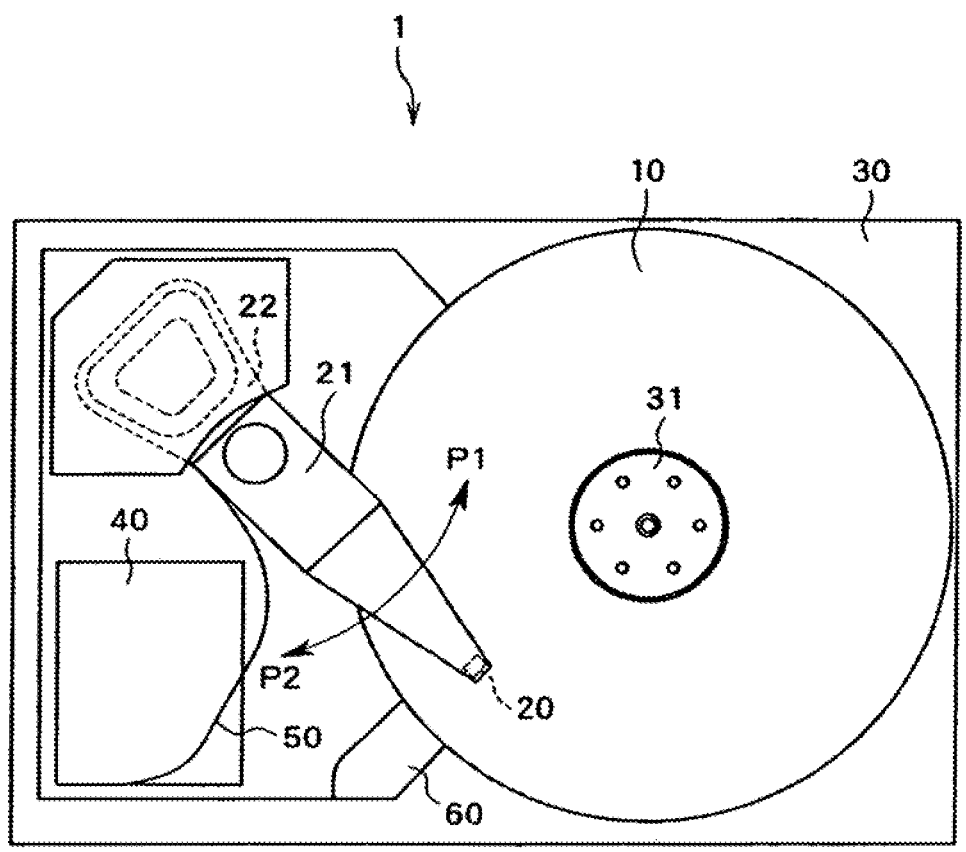
FIG. 1 is a plan view showing one example of the magnetic disk unit according to an embodiment of the present invention.

FIG. 1 is a plan view showing the magnetic disk unit 1 according to one embodiment of the present invention. The magnetic disk unit 1 comprises a magnetic disk 10 for information recording and a magnetic head 20 for information writing and reading to and from the magnetic disk 10, both components being accommodated in an enclosure 30.

The magnetic disk 10 is rotatably supported on a spindle motor (SPM) 31. The magnetic head 20 is attached to that side of the forward end of a head assembly 21 which faces the magnetic disk 10. According to this embodiment, the magnetic head 20 is designed for perpendicular magnetic recording. The head assembly 21 is slidably supported by a voice coil motor (VCM) 22.

The enclosure 30 is provided with a circuit board 40, on which are mounted a motor driver to control SPM 31 and VCM 22, a hard disk controller (HDC) to send and receive data to and from a host computer (not shown) with which the magnetic disk unit 1 is connected, a read/write channel to modulate and demodulate information written and read to and from the magnetic disk 10, a microprocessing unit (MPU) to perform operation for information writing and reading to and from the magnetic disk 10, and a memory to store date for processing by MPU. Incidentally, MPU is a central processing unit (CPU) and the memory is synchronous dynamic random access memory (SDRAM).

The circuit board 40 and the magnetic head 20 are electrically connected with each other through a flexible cable 50. That is, the head assembly 21 has a wiring (not shown), with one end thereof connected with the magnetic head 20 and with the other end thereof connected with one end of the flexible cable 50. The other end of the flexible cable 50 is connected with the circuit board 40.

For the magnetic disk unit 1 to work, the magnetic head 20 receives data from the host computer and records and reads information corresponding to the data to and from the magnetic disk 10.

Information writing to the magnetic disk 10 is accomplished as the head assembly 21 swings over the magnetic disk 10 until the magnetic head 20 is positioned at a desired track containing a sector in which the information is to be written and the magnetic head 20 generates a magnetic field in synchronism with the rotating magnetic disk 10, thereby magnetizing the sector.

Reading of information from the magnetic disk 10 is accomplished as the head assembly 21 swings over the magnetic disk 10 until the magnetic head 20 is positioned at a desired track containing a sector in which the information has been written and the magnetic head 20 detects the magnetic field generated by the sector in synchronism with the rotating magnetic disk 10.

According to this embodiment, the magnetic disk unit 1 is so constructed as to work by the load/unload system. That is, there exists in the enclosure 30 a ramp 60 that permits the magnetic head 20 to retract when the magnetic head 20 moves beyond the periphery of the magnetic disk 10.

After the magnetic head 20 in its load state over the magnetic disk 10 has completed writing or reading of information to or from the magnetic disk 10, the head assembly 21 swings to move the magnetic head 20 outward (or toward P2) for its retraction onto the ramp 60, as shown in FIG. 1.

On the other hand, when the magnetic head 20 is in its unload state (or the magnetic head 20 is resting on the ramp 60) and is about to start writing or reading information to or from the magnetic disk 10, the head assembly 21 swings to move the magnetic head 20 inward (or toward P1) and place it on the magnetic disk 10. In alternative embodiments, the above-mentioned system may be replaced with the contact start stop (CSS) system in which the magnetic head 20 retracts to a specific position on the magnetic disk 10 in place of the ramp outside the magnetic disk 10.

Figures 2, 3, 4:
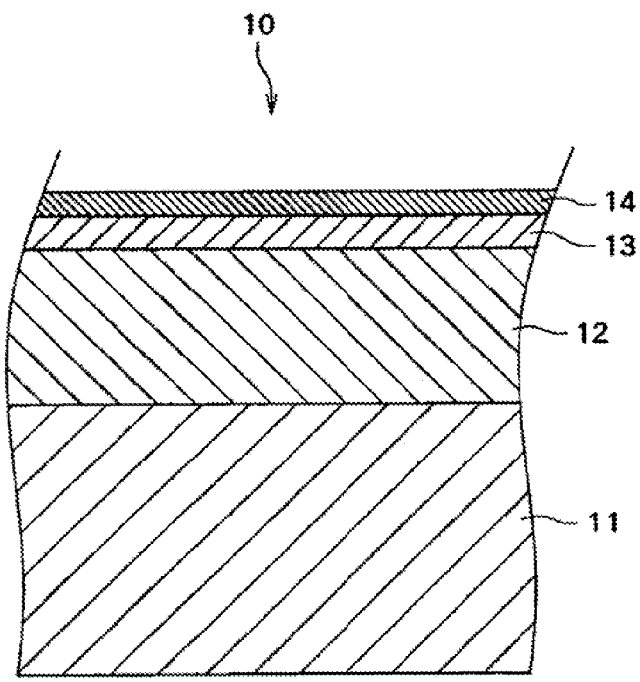
FIG. 2 is a partly sectional view showing one example of the magnetic disk according to an embodiment of the present invention.
FIG. 3 shows the result of the test for floating and self-restoration which was performed on a magnetic disk according to an embodiment of the present invention.
FIG. 4 shows the result of the vacuum test performed on the magnetic disk according to an embodiment of the present invention.

FIG. 2 is a partly sectional view of one example of the magnetic disk 10. The magnetic disk 10 comprises a non-magnetic substrate 11 and three layers sequentially formed thereon which include a magnetic layer 12, a protective layer 13, and a lubricating layer 14.

The non-magnetic substrate 11 may be discoid and made of a non-magnetic material, such as glass and aluminum.

The magnetic layer 12 on the non-magnetic substrate 11 is a thin film of magnetic material, such as cobalt alloy. It may be formed by sputtering.

The protective layer 13 is on that side of the magnetic layer 12, which is adjacent to the magnetic head 20. It is formed from a carbon-based material, such as diamond-like carbon, by sputtering or ion beam deposition (IBD).

The lubricating layer 14 is on that side of the protective layer 13 which is adjacent to the magnetic head 20. It is the outermost layer to cover the surface of the magnetic disk 10. It is formed from a lubricant (mentioned later) by dipping.

There may be a seed layer and an underlying layer (both not shown) interposed between the non-magnetic substrate 11 and the magnetic layer 12. In this case the non-magnetic substrate 11 is coated sequentially with a seed layer of nickel alloy, an underlying layer of chromium alloy, and the magnetic layer 12.

The magnetic layer 12 may also comprise a lower magnetic layer, an intermediate layer, and an upper magnetic layer (all not shown). In this case the magnetic layer 12 is coated sequentially with a lower magnetic layer of cobalt alloy, an intermediate layer of ruthenium (Ru), and an upper magnetic layer of cobalt alloy.

The magnetic disk unit 1 mentioned above, which is provided with the magnetic disk 10 having at least the magnetic layer 12, the protective layer 13, and the lubricating layer 14, permits the magnetic head 20 to float above the magnetic disk 10 with a flying height of 10 nm or less.

The magnetic disk unit 1 may be designed such that the flying height of the magnetic head 20 is 10 nm or smaller than 8 nm, particularly 1 to 5 nm, for the higher recording density. Incidentally, the flying height is a distance between the end (facing the magnetic disk 10) of the magnetic head 20 and the surface (facing the magnetic head 20) of the lubricating layer 14 formed on the magnetic disk 10.

According to this embodiment, the magnetic head 20 is brought into contact with the magnetic disk 10 and then allowed to float above the magnetic disk 10 at a prescribed height (e.g., smaller than 10 nm) from the contact point.

To be specific, the magnetic disk unit 1 moves the magnetic head 20 so that the end thereof gradually approaches the magnetic disk 10 until contact between them. Contact is monitored by the float monitoring section (not shown) in the circuit board 40, which detects special signals that appear when the magnetic head 20 vibrates.

The float monitoring section recognizes contact between the magnetic head 20 and the magnetic disk 10 when it detects that vibration of the magnetic head 20 has increased beyond a prescribed threshold value. It also keeps the contact position as the reference position to determine the flying height of the magnetic head 20. In other words, the reference position is the position at which the magnetic head 20 comes into contact with the surface of the lubricating layer 14 on the magnetic disk 10.

Then, the float monitoring section causes the end of the magnetic head 20 to gradually leave the magnetic disk 10 until it reaches a position which is a prescribed distance away from the magnetic disk 10. The magnetic head 20 is fixed at that position (or flying height). In this way the magnetic head 20 floats above the magnetic disk 10 while keeping an extremely small flying height (say, 10 nm or less) accurately.

The extremely small flying height for the magnetic head 20 may be achieved by applying an electric energy to the end of the magnetic head 20, thereby thermally expanding it toward the magnetic disk 10.

The magnetic head 20 for this purpose has a heater inside the head element. Upon voltage application, the heater generates heat and expands (or projects) the end of the magnetic head 20 toward the magnetic disk 10. The result is a decrease in flying height (or the distance between the magnetic head 20 and the magnetic disk 10). With the applied voltage reduced, the end of the magnetic head 20 shrinks, thereby increasing the distance between the magnetic head 20 and the magnetic disk 10. In this way the magnetic disk unit 1 achieves accurate control of flying height as it controls the amount of projection of the magnetic head 20 by adjusting the voltage to be applied to the magnetic head 20. This process is based on data representing the relation between the magnitude of voltage to be applied and the amount of projection of the magnetic head 20.

The following is a detailed description of the lubricant of the lubricating layer 14. The lubricant comprises two ingredients.

The first ingredient is a first perfluoropolyether compound ("the first PFPE compound") represented by the formula (1) which has a weight-average molecular weight of 500 to 6000 and a dispersity smaller than 1.3.

$$Rt\text{-}Rf^1\text{-}Rt \quad (1)$$

where, $Rf^1$ denotes a perfluoropolyether chain represented by the formula (2) and Rt denotes a terminal group represented by the formula (3):

$$-CF_2O-[(CF_2CF_2O)_m-(CF_2O)_n]-CF_2- \quad (2)$$

where, m and n each denote a natural number:

(3)

If the first ingredient has a weight-average molecular weight smaller than 500, the lubricant would partly vaporize as it increases in temperature under certain operating conditions or environmental conditions of the magnetic disk unit 1. Moreover, the lubricant creeps outward or flies off due to centrifugal force produced by the magnetic disk 10 rotating at higher than 5000 rpm (revolutions per minute), which causes the lubricating layer 14 to remarkably decrease in thickness.

By contrast, if the first ingredient has a weight-average molecular weight larger than 6000, the lubricant would have a high viscosity, which leads to poor flowability (or recoverability). It may be difficult to form a highly viscous lubricant into a uniform thin layer (about 1 nm thick) on the magnetic disk 10. This leads to incomplete coating on the magnetic disk 10.

For the reasons mentioned above, the first ingredient should have a weight-average molecular weight of 500 to 6000, particularly 1000 to 4000 for the magnetic disk 10 rotating at 5000 to 15000 rpm.

The first PFPE compound usually contains three secondary components which are those compounds represented by the formula (1) above in which the terminal group (Rt) is represented by any of the following formulas (8) to (10). These secondary components form during production of the first PFPE compound,

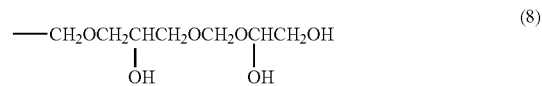
(8)

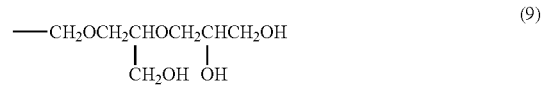
(9)

(10)

In other words, the first ingredient may contain not only the first PFPE compound but also the following three compounds as secondary components. The first one is a compound represented by the formula (I) in which the terminal group (Rt) attaching to the main chain ($Rf^1$) is that represented by the formula (8). The second one is a compound represented by the formula (1) in which the terminal group (Rt) attaching to the main chain (Rf1) is that represented by the formula (9). The third one is a compound represented by the formula (1) in which the terminal group (Rt) attaching to the main chain ($Rf^1$) is that represented by the formula (10).

The first ingredient containing these secondary components in a large amount has a broad molecular weight distribution, which is harmful to the magnetic head 20 that is to float at an extremely small flying height of 10 nm or less.

Of the foregoing secondary compounds, the third one having a small molecular weight should be minimized, because it makes the lubricating layer 14 irregular each time the magnetic head 20 floats above the magnetic disk 10, thereby causing the lubricant to stick easily to the magnetic head 20.

The lubricant sticking to the magnetic head 20 deteriorates the read/write performance of the magnetic disk unit 1. In addition, the lubricating layer 14 which has been made irregular deteriorates the long-term reliability of the magnetic disk unit 1.

The foregoing makes it necessary for the first ingredient to have a dispersity smaller than 1.3, particularly smaller than 1.2. The term "dispersity" is defined as the ratio (Mw/Mn) of the weight-average molecular weight (Mw) to the number-average molecular weight (Mn).

The first ingredient (100 pbw in total) should contain the first PFPE compound in an amount no less thin 80 pbw, preferably no less than 90 pbw. In other words, the amount of the first PFPE compound should be as close to 100 pbw as possible. The higher the content of the first PFPE compound in the first ingredient, the closer the characteristics of the first ingredient is to that of the first PFPE compound.

The lubricant (100 pbw in total) may contain the first PFPE compound in an amount of 8 to 92 pbw. If the content of the first PFPE compound is less than 8 pbw and the content of the second PFPE compound is more than 92 pbw, the lubricating layer 14 loses its flowability due to the first PFPE compound.

Insufficient flowability leads to incapability of restoring a local decrease of lubricant in the magnetic disk 10 which occurs when the magnetic head 20 floats. This impairs the long-term reliability of the magnetic disk 10 and the magnetic disk unit 1.

On the other hand, if the content of the first PFPE compound is more than 92 pbw and the content of the second PFPE compound is less than 8 pbw, the lubricating layer 14 loses its adhesion to the magnetic disk 10 due to the second PFPE compound.

This reduces the durability of the magnetic disk 10 and the magnetic disk unit 1 under severe environmental conditions, such as high temperatures and reduced atmospheric pressure.

The first ingredient mentioned above may be prepared from any lubricant designated as Z TETRAOL GT Series available from Solvay Solexis Corp.

The second ingredient is a second perfluoropolyether compound ("the second PFPE compound"), which is characterized by a weight-average molecular weight ranging from 500 to 6000 and also by an average number ranging from 6 to 10 for hydroxyl groups contained in one molecule.

The second PFPE compound should have a weight-average molecular weight of 500 to 6000, preferably 1000 to 4000, for the same reasons as mentioned above for the first PFPE compound.

The lubricant composed of the first and second ingredients may have (as a whole) a weight-average molecular weight of 500 to 6000, and possibly more desirably 1000 to 4000.

Any lubricant containing the second PFPE compound with less than 6 hydroxyl groups in one molecule would be poor in binding to the magnetic disk 10. By contrast, any lubricant containing the second PFPE compound with more than 10 hydroxyl groups in one molecule has an excessively high polarity and hence is poor in solubility in fluorine-based solvents and in miscibility with other perfluoropolyethers. This causes troubles in processing and makes quality control difficult owing to moisture absorption. Moreover, the second PFPE compound with hydroxyl groups more than specified above tends to coagulate easily, thereby preventing the lubricant from spreading over the magnetic disk 10 into a uniformly thin layer (about 1 nm thick) as the lubricating film 14. It is also subject to degradation by oxidation.

Therefore, the number of hydroxyl groups in one molecule of the second PFPE compound should be from 6 to 10, and may be between about 8 to 10.

The second PFPE compound may have its hydroxyl groups in each molecule partly in the form of terminal groups or structural units represented by the formula (4) and/or (5) below. In other words, it may have terminal hydroxyl groups as well as hydroxyl groups attached to the main chain represented by the formula (4) and/or (5):

(4)

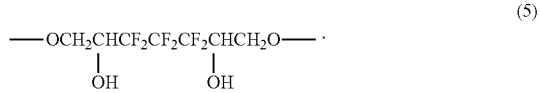

(5)

The second PFPE compound comprising molecules defined above, effectively prevents interaction between the magnetic disk 10 and the magnetic head 20 owing to the less bulky molecules.

The structural unit represented by the formula (4) or (5) has the hydroxyl groups at least partly attached directly to the main chain of the second PFPE compound. This indicates that some hydroxyl groups exist near the straight chain. Thus the second PIPE compound binds to the surface of the magnetic disk 10 through not only hydroxyl groups attached to its terminals but also hydroxyl groups attached to its main chain.

Thus the individual molecules of the second PFPE bind to the surface of the magnetic disk 10 in a stable manner and the individual molecules of the second PIPE binding to the surface of the magnetic disk 20 have a low physical height. This makes the lubricating layer 14 bind firmly to the magnetic disk 10 and effectively reduces the thickness of the lubricating layer 14.

The second PFPE compound may be a compound represented by the formula (6):

$$Rt\text{-}Rf^1\text{-}Rf^2\text{-}Rf^1\text{-}Rt \qquad (6)$$

where, $Rf^1$ denotes a perfluoropolyether chain represented by the formula (2), Rt denotes a terminal group represented by the formula (3) which contains part of the hydroxyl groups, and $Rf^2$ denotes a straight chain which contains another part of the hydroxyl groups.

In this case, too, the individual molecules of the second PFPE compound stably exist on the magnetic disk 10 while keeping a less bulky state. This effectively prevents interaction between the magnetic disk 10 and the magnetic head 20.

The molecule of the second PFPE compound has 2 to 6 hydroxyl groups, in addition to 4 hydroxyl groups in the terminal groups Rt, in the straight chain Rf2 held between the perfluoropolyether chains $Rf^1$. Therefore, the individual molecules of the second PFPE compound stably bind to the surface of the magnetic disk 10 through the terminal parts and central parts while keeping a physically low state.

It follows that both the first PFPE compound and the second PFPE compound have in common the terminal group Rt and perfluoropolyether chain $Rf^1$. This contributes to good miscibility of the first and second components, and the resulting lubricant has the characteristics of the first and second PFPE compounds in combination.

In the case where the second PFPE compound is a compound represented by the formula (6), the straight chain $Rf^2$ in the formula (6) may have at least either of the structural units represented by the formula (4) or (5) in which there exist part of hydroxyl groups possessed by the second PFPE compound. In other words, the straight chain $Rf^2$ is the structural unit represented by either of the formula (4) or (5) or both of the formulas (4) and (5), which has hydroxyl groups other than those at the terminal group Rt.

If the second PFPE compound has part of hydroxyl groups in the main chain as mentioned above, the main chain may also contain the repeating straight chain structure of fluorocarbon ($CF_2$).

The second PFPE compound mentioned above may typically be a compound represented by the formula (7) below,

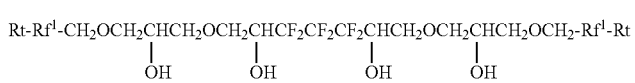

(7)

where, Rf¹ denotes a perfluoropolyether chain represented by the formula (2) and Rt denotes a terminal group represented by the formula (3).

The second PFPE compound may also be defined as a compound represented by the formula (6) in which part of hydroxyl groups in each molecule exist in the terminal group Rt and remaining hydroxyl groups exist in the main chain composed of structural units represented by the formulas (4) and (5), the main chain containing repeating straight chain structure of fluorocarbon ($CF_2$).

In this case, too, the second PFPE compound composed of molecules defined above effectively prevents interaction between the magnetic disk 10 and the magnetic head 20 owing to the less bulky molecules.

The second ingredient mentioned above may be prepared from any lubricant designated as Z TMD series available from Hitachi Global Storage Technologies Corp.

The second PFPE compound may be replaced by the first or second secondary compound mentioned above. Having 6 hydroxyl groups in each molecule, these compounds firmly bind to the magnetic disk 10 and stably stay on the magnetic disk 10.

The lubricant comprising the first and second ingredients imparts abhesiveness, binding power, and adequate flowability to the lubricating layer 14 on the magnetic disk 10.

The magnetic head 20 is subject to deterioration in floating characteristics, which in turn adversely affects the read/write characteristics of the magnetic disk unit 1, as its flying height decreases to such an extent that it could physically contact with the magnetic disk 10. Even though no contact occurs in such a case, the magnetic head 20 interacts with the lubricant present at the top of the magnetic disk 10, resulting in the lubricant sticking to the magnetic head 20 or the lubricant which has once stuck to the magnetic head 20 drops on the magnetic disk 10.

In addition, the lubricant becomes unevenly distributed on the magnetic disk 10 due to pressure fluctuation that occurs more easily at the air bearing surface as the flying height decreases, because the magnetic head 20 is so designed as to float above the magnetic disk 10 at a prescribed flying height by means of pressure against the air bearing surface (or that side of the slider of the magnetic head 20 which faces the magnetic disk 10). The uneven distribution of the lubricating layer 14 also adversely affects the read/write characteristics of the magnetic disk unit 1 and the long-term reliability of the magnetic disk unit 1. Therefore, the lubricant to be used under severe conditions needs better durability and abhesiveness (to the magnetic head 20) than before.

The lubricant to meet requirements for improved performance as well as long-term reliability should also have adequate flowability or ability for restoration. This is because the lubricant becomes distributed irregularly on the magnetic disk 10 despite its strong binding force as the result of movement that occurs during use for a long period of time under varied environmental conditions (including temperature, atmospheric pressure, and vibration) under which the magnetic disk unit 1 operates. The lubricant receives pressure under the magnetic head 20 floating above it and also creeps outward due to centrifugal force produced by the magnetic disk 10.

The lubricant should have adequate flowability so that it can restore the irregular distribution mentioned above. Without such flowability, the magnetic disk unit 1 does not have high reliability. For the magnetic disk unit 1 to keep high reliability even though the magnetic head 20 has a flying height as small as 10 nm or less, a lubricant is necessary that remains stable in the extremely small gap between the magnetic head 20 and the magnetic disk 10. In other words, the lubricant for the magnetic disk 10 should have mutually contradictory characteristics—ability to strongly bind to the magnetic disk 10 and ability to flow adequately.

With the foregoing in mind, the present inventors investigated the floating characteristics of the magnetic head 20 whose flying height is as small as 10 nm or less. It was found that it is possible to prevent the sticking of the lubricant to the magnetic head 20 and the locally irregular distribution of the lubricant on the magnetic disk 10 if the lubricant contains the first PFPE compound of high purity which binds and flows adequately to and on the magnetic disk 10.

It was also found that the magnetic disk 10 and the magnetic disk unit 1 retain long-term reliability under severe operating conditions with an extremely small flying height (10 nm or less) if the first ingredient (which is the first PFPE compound of high purity) is incorporated with the second PFPE compound of high polarity capable of firmly binding to the magnetic disk 10.

This finding shows that the combination of the first and second ingredients realizes the desirable lubricant. The first ingredient has adequate flowability and adequate power of binding to the magnetic disk 10. The second ingredient has so high power of binding to the magnetic disk 10 as to stay thereon under severe operating conditions. Thus the resulting lubricant has abhesiveness to the magnetic head 20, adequate flowability, and ability to bind to the magnetic disk 10.

The foregoing indicates that embodiments of the present invention realize the magnetic disk 10 and the magnetic disk unit 1 which keep good reliability for a long period of time even under the operating condition that the flying height of the magnetic head 20 is as small as 10 nm or less. Under such operating condition, the lubricant does not stick to the magnetic head 20 but remains uniformly on the surface of the magnetic disk 10.

The following describes the magnetic disk 10 and the magnetic disk unit 1 by way of typical examples.

EXAMPLES

The reference material used for comparison is commercial Z TETRAOL (from Solvay Solexis) composed mainly of the first PFPE compound. It will be referred to as "PFPE(I)" hereinafter. PFPE(I) has a weight-average molecular weight of 2155 and a dispersity of 1.5 and contains the first PFPE compound in an amount of 71 pbw for its total amount of 100 pbw.

The lubricant that can be used as the first ingredient is Z TETRAOL GT (from Solvay Solexis) composed mainly of the first PFPE compound. It will be referred to as "PFPE(II)" hereinafter. PFPE(II) has a weight-average molecular weight of 2130 and a dispersity of 1.2 and contains the first PFPE compound in an amount of 89 pbw for its total amount of 100 pbw.

The lubricant that can be used as the second ingredient is ZTMD (from Hitachi Global Storage Technologies). It will be referred to as "PFPE(III) hereinafter. PFPE(III) is the second PFPE compound which has 8 hydroxyl groups in one molecule as represented by the formula (7). It has a weight-average molecular weight of 2661.

PFPE(I), PFPE(II), and PFPE(III) are used to form the lubricating layer 14 on the magnetic disk 10 as follow. A 2.5-inch circular glass substrate is coated sequentially by sputtering with a seed film of nickel alloy, an underlying film of chromium alloy, a lower magnetic film of cobalt alloy, an intermediate film of ruthenium, and an upper magnetic film of cobalt alloy. The top layer is covered by ion beam method with a 3.5-nm thick film of diamond-like carbon (DLC). On the DLC film is formed by dipping the lubricating layer 14 composed of PFPE(I), PFPE(II), or PFPE(III), which has a uniform thickness of 1 nm.

Test for Floating

For test for floating, the magnetic disk 10 is mounted on a spin stand tester provided with the magnetic head 20 of load/unload type. The test consists of allowing the magnetic head 20 to float above the magnetic disk 10 running at 5400 rpm for 30 minutes. During the test, the magnetic head 20 is placed at a position which is 16 mm away from the center of the magnetic disk 10.

The magnetic head 20 is of thermally controlled type, and its flying height is kept at 2 nm. The test is carried out under the environment of normal temperature and normal humidity. Sticking of the lubricant to the magnetic head 20 is examined by observing the magnetic head 20 under an optical microscope after the test is completed.

The behavior of the lubricant on the surface of the magnetic disk 10 is evaluated by using an OSA (optical surface analyzer). The lubricating layer 14 formed on the surface of the magnetic disk 10 is subject to appreciable deformation by the magnetic head 20 passing over it. This deformation leads to minute convexes and concaves. The difference between the average thickness of the lubricating layer 14 and the maximum thickness at the highest convex is regarded as the "maximum convex height", which is used as an index to show the behavior of the lubricant.

Test for Restoration

For test for restoration, the magnetic disk 10 is mounted on the spin stand tester as used in test for floating. The test consists of allowing the magnetic head 20 to float above the magnetic disk 10 running at 5400 rpm for 4 hours. During the test, the magnetic head 20 is placed at a position which is 17 mm away from the center of the magnetic disk 10.

The magnetic head 20 is of thermally controlled type. It is pushed toward the magnetic disk 10 so that its position is kept at about 2 nm below a point at which it contacts with the magnetic disk 10. The test is carried out under the environment of normal temperature and normal humidity.

The self-restoration of the lubricant on the surface of the magnetic disk 10 is evaluated by using an OSA. The test is completed when the magnetic head is unloaded. Immediately after the test is completed, the lubricating layer 14 is examined for the average decrease in thickness at that position of the magnetic disk 10 above which the magnetic head 20 floats. (The average decrease in thickness is an average depth of concaves measured with reference to the average thickness of the lubricating layer 14.) The result of measurement is recorded as "the first average decrease in thickness D1". The lubricating layer 14 is also examined for the average decrease in thickness in the same way as mentioned above 24 hours after completion of the test. The result of measurement is recorded as "the second average decrease in thickness D2". The value calculated from D2/D1×100 is regarded as the ratio (%) of self-restoration. This ratio indicates the ability of the lubricant to restore its uniform thickness after deformation.

FIG. 3 shows the results of the tests for floating and self-restoration. It is noted from FIG. 3 that the magnetic disk 10 with PFPE(I) gives the maximum convex height which is largest among the samples tested and also causes the lubricant to stick to the magnetic head 20.

By contrast, it is also noted from FIG. 3 that the magnetic disk 10 with PFPE(II) or PFPE(III) gives the maximum convex height which is small and does not cause the lubricant to stick to the magnetic head 20.

The result of test for self-restoration, which is shown in FIG. 3, indicates that PFPE(II) gives a higher ratio of restoration than PFPE(I) and PFPE(III), and PFPE(I) gives a higher ratio of restoration than PFPE(III).

As mentioned above, PFPE(II) produces good results in both the test for floating and the test for self-restoration. By contrast, PFPE(III) produces good results in the test for floating but does not produce good results in the test for self-restoration. In addition, PFPE(I) is inferior in characteristic properties to either PFPE(II) or PFPE(III).

Here, the major component of PFPE(I) and PFPE(II) is the first PFPE compound. The difference between them is the content of the first PFPE compound or the content of secondary components other than the major component. This difference may be attributable to the results of test mentioned above.

In fact, PFPE(I) contains about 10 wt % of the first and second secondary compounds (in total) and about 10 wt % of the third secondary compound, with the remainder (about 80 wt %) being the first PFPE.

The test result of PFPE(I) shown in FIG. 3 indicates that the lubricating layer 14 composed of PFPE(I) readily flows to become irregular in thickness and also readily sticks to the magnetic head 20 when the magnetic disk is run under the condition that the flying height of the magnetic head 20 is as small as 10 nm or less.

The foregoing results may be attributable to the third secondary compound present in PFPE(I). That is, the third secondary compound has a smaller molecular weight than the first PFPE compound as the major ingredient. In addition, having only 2 hydroxyl groups in one molecule, it does not firmly bind to the magnetic disk 10.

This is a probable reason that PFPE(I) flows on the surface of the magnetic disk 10 more easily than necessary, which leads to remarkable increase in the maximum convex height and easy adhesion to the magnetic head 20 which are observed in the test for floating.

On the other hand, analysis by nuclear magnetic resonance (NMR) indicates that PFPE(II) contains only about 5 wt % of the third secondary compound. This content is about one half that of PFPE(I). Consequently, PFPE(II) is less flowable than PFPE(I), and this is a probable reason for no sticking to the magnetic head 20.

PFPE(I) contains the first and second secondary compounds more than PFPE(II). Having 6 hydroxyl groups and high polarity, these secondary compounds bind to the magnetic disk 10 more firmly than the first PFPE compound.

Therefore, PFPE(I) binds to the magnetic disk 10 more firmly than PFPE(II). This is a probable reason that as compared with the lubricating film 14 composed of PFPE(II), the lubricating film 14 composed of PFPE(I) keeps its irregular state more easily and is poorer in self-restoration once it has become irregular.

The foregoing suggests that the lubricant to be applied to the magnetic disk unit 1 which runs under the severe condition that the flying height of the magnetic head 20 is as small as 10 nm or less should not contain any component which has a low molecular weight, contains a small number of hydroxyl groups in one molecule, and is incapable of binding to the magnetic disk 10.

It was also found that PFPE(II) containing a less amount of secondary components and the first PFPE compound of high purity has good abhesiveness (properties of non-sticking to the magnetic head 20) and adequate flowability to minimize the height of the maximum convex and to achieve good self-restoration.

On the other hand, it was found that owing to the second PFPE compound, which has 8 hydroxyl groups and hence firmly binds to the magnetic disk 10, PFPE(III) is poor in self-restoration but is comparable to PFPE(II) in the height of the maximum convex and has good abhesiveness.

Vacuum Test

The same magnetic disks 10 as those used for float test and restoration test mentioned above are prepared. Each of them has the lubricating layer 14 composed of PFPE(I), PFPE(II), or PFPE(III). They are used to construct six each of the magnetic disk unit 1 differing in lubricant.

The magnetic disk unit 1 is placed individually in a vacuum chamber and is run to cause the magnetic head to perform reading and writing randomly at room temperature. During this process, the vacuum chamber is gradually evacuated. As pressure decreases in the vacuum chamber, the flying height of the magnetic head decreases. This increases the possibility of interaction between the magnetic head 20 and the lubricating layer 14 and contact between the magnetic head 20 and the magnetic disk 10. Thus the vacuum test creates a severe environment in which contact takes place between the magnetic head 20 and the magnetic disk 10. In this way it is possible to prove the durability of the magnetic disk 10 or the ability of the lubricant to bind to the magnetic disk 10.

To be specific, the pressure in the chamber is kept at 0.459 atm (equivalent to the pressure at an altitude of 20,000 ft), and the magnetic disk unit 1 is tested for hard errors under this condition. The number of the magnetic disk unit 1 with hard errors is counted for each group of six units having PFPE(I), PFPE(II), or PFPE(III).

FIG. 4 shows the result of the vacuum test. It is noted from FIG. 4 that no hard errors occur in all the six samples of the magnetic disk unit 1 with the lubricating layer 14 of PFPE(I) or PFPE(III). By contrast, hard errors occur in 3 samples out of 6 samples with the lubricating layer 14 of PFPE(II). In other words, the magnetic disk 10 with PFPE(II) and the magnetic disk unit 1 provided with it are remarkably poor in durability.

The result of vacuum test shown in FIG. 4 may be attributable to the difference in content of PFPE(I) and PFPE(II) in the first PFPE compound or the difference in content of secondary components.

How firmly the lubricant binds to the magnetic disk 10 is an important factor in vacuum test for durability. That component of the lubricant which contributes to binding is a highly polar compound. That is, the second PFPE compound having 8 hydroxyl groups improves the binding performance of the lubricant. Those compounds having many hydroxyl groups in one molecule include the first and second secondary compounds (mentioned above) which has 6 hydroxyl groups. They exist in PFPE(I) in an amount of about 10 wt %.

There exist very few of highly polar perfluoropolyether compounds having more than 6 hydroxyl groups in PFPE(II). This is a probable reason that the magnetic disk 10 with PFPE(II) and the magnetic disk unit 1 provided with it are inferior in durability to the magnetic disk 10 with PFPE(I) and the magnetic disk unit 1 provided with it.

The foregoing suggests that a perfluoropolyether compound, such as the first PFPE compound, having 4 hydroxyl groups is not satisfactory in the case where the flying height of the magnetic disk 20 is as small as 10 nm or less. Its polarity alone is not enough for the long-term durability required. Moreover, the first PFPE compound of high purity does not exhibit all the characteristics required of the lubricant.

The foregoing suggests that the lubricant to be applied to the magnetic disk unit 1 which runs under the severe condition that the flying height of the magnetic head 20 is as small as 10 nm or less should contain a highly polar component that firmly binds to the magnetic disk 10.

It is concluded from the foregoing that the lubricant containing only one of PFPE(I), PFPE(II), or PFPE(III) does not meet all of the three requirements defined below when it is used under the condition that the flying height of the magnetic head 20 is as small as 10 nm or less.

(i) Abhesiveness or ability to prevent adhesion to the magnetic head 20.
(ii) Adequate flowability to enhance self-restoration.
(iii) Sufficient binding power to make the lubricant to withstand severe environment.

The foregoing discussion leads to a conclusion that a mixture of PFPE(II) and PFPE(III) gives a lubricant which meets all the requirements of abhesiveness, adequate flowability, and strong binding force.

Studies based on comparison between the PFPE(I) and PFPE(II) about the content of secondary components revealed that the content of the first PFPE compound should preferably be no less than 80 pbw for 100 pbw of the first ingredient in total.

The result of vacuum test on PFPE(I) indicates that the first secondary compound having 6 hydroxyl groups and the second secondary compound can be used as the second ingredient. However, it also indicates that the second PFPE compound, such as PFPE(III) having 8 hydroxyl groups, is also desirable as the second ingredient.

The lubricant which contains the first ingredient and the second ingredient as mentioned above remains stable on the surface of the magnetic disk without sticking to the magnetic head 20 over a long period of time even though the flying height of the magnetic head 20 is as small as 10 nm or less. This helps realize the magnetic disk 10 and the magnetic disk unit 1 provided therewith which have high long-term reliability.

What is claimed is:

1. A lubricant, comprising:
a first ingredient and a second ingredient, said first ingredient as the main constituent being a first perfluoropolyether compound represented by the formula (1) which has a weight-average molecular weight of 500 to 6000 and a dispersity smaller than 1.3, and said second ingredient being a second perfluoropolyether compound which has a weight-average molecular weight of 500 to 6000 and has 6 to 10 hydroxyl groups (on average) in one molecule, $$Rt-Rf^1-Rt \tag{1}$$

where, $Rf^1$ denotes a perfluoropolyether chain represented by the formula (2) and Rt denotes a terminal group represented by the formula (3), $$-CF_2O-[(CF_2CF_2O)_m-(CF_2O)_n]-CF_2- \quad (2)$$

where, m and n each denote a natural number, $$-CH_2OCH_2\underset{\underset{OH}{|}}{C}HCH_2OH. \quad (3)$$

2. The lubricant according to claim 1, wherein said lubricant contains said first perfluoropolyether compound in an amount of 8 to 92 pbw for 100 pbw of said lubricant.

3. The lubricant according to claim 1, wherein said second perfluoropolyether compound has part of said hydroxyl groups at terminals and also has another part of said hydroxyl groups in the main chain in the form of structural unit represented by at least either of the formula (4) or (5), $$-OCH_2\underset{\underset{OH}{|}}{C}HCH_2O- \quad (4)$$

$$-OCH_2\underset{\underset{OH}{|}}{C}HCF_2CF_2CF_2\underset{\underset{OH}{|}}{C}HCH_2O- \quad (5)$$

4. The lubricant according to claim 1, wherein said second perfluoropolyether compound is a compound represented by the formula (6), $$Rt-Rf^1-Rf^2-Rf^1-Rt \quad (6)$$

where, $Rf^1$ denotes a perfluoropolyether chain represented by the formula (2), Rt denotes a terminal group represented by the formula (3) which contains part of said hydroxyl groups, and $Rf^2$ denotes a straight chain which contains another part of said hydroxyl groups.

5. The lubricant according to claim 4, wherein the straight chain $Rf^2$ in the formula (6) is a structural unit which has another part of said hydroxyl groups represented by at least either of the formula (4) or (5).

6. The lubricant according to claim 1, wherein said second perfluoropolyether compound is a compound represented by the formula (7), $$Rt-Rf^1-CH_2OCH_2\underset{\underset{OH}{|}}{C}HCH_2OCH_2\underset{\underset{OH}{|}}{C}HCF_2CF_2CF_2\underset{\underset{OH}{|}}{C}HCH_2OCH_2\underset{\underset{OH}{|}}{C}HCH_2OCH_2-Rf^1-Rt \quad (7)$$

where, $Rf^1$ denotes a perfluoropolyether chain represented by the formula (2) and Rt denotes a terminal group represented by the formula (3).

7. A lubricant, consisting essentially of
a first ingredient and a second ingredient, said first ingredient as the main constituent being a first perfluoropolyether compound represented by the formula (1) which has a weight-average molecular weight of 500 to 6000 and a dispersity smaller than 1.3, and said second ingredient being a second perfluoropolyether compound which has a weight-average molecular weight of 500 to 6000 and has 6 to 10 hydroxyl groups (on average) in one molecule, $$Rt-Rf^1-Rt \quad (1)$$

where, $Rf^1$ denotes a perfluoropolyether chain represented by the formula (2) and Rt denotes a terminal group represented by the formula (3), $$-CF_2O-[(CF_2CF_2O)_m-(CF_2O)_n]-CF_2- \quad (2)$$

where, in and n each denote a natural number, $$-CH_2OCH_2\underset{\underset{OH}{|}}{C}HCH_2OH. \quad (3)$$

8. The lubricant according to claim 7, wherein said lubricant contains said first perfluoropolyether compound in an amount of 8 to 92 pbw for 100 pbw of said lubricant.

9. The lubricant according to claim 7, wherein said second perfluoropolyether compound has part of said hydroxyl groups at terminals and also has another part of said hydroxyl groups in the main chain in the form of structural unit represented by at least either of the formula (4) or (5), $$-OCH_2\underset{\underset{OH}{|}}{C}HCH_2O- \quad (4)$$

$$-OCH_2\underset{\underset{OH}{|}}{C}HCF_2CF_2CF_2\underset{\underset{OH}{|}}{C}HCH_2O- \quad (5)$$

10. The lubricant according to claim 7, wherein said second perfluoropolyether compound is a compound represented by the formula (6), $$Rt-Rf^1-Rf^2-Rf^1-Rt \quad (6)$$

where, $Rf^1$ denotes a perfluoropolyether chain represented by the formula (2), Rt denotes a terminal group represented by the formula (3) which contains part of said hydroxyl groups, and $Rf^2$ denotes a straight chain which contains another part of said hydroxyl groups.

11. The lubricant according to claim 10, wherein the straight chain $Rf^2$ in the formula (6) is a structural unit which has another part of said hydroxyl groups represented by at least either of the formula (4) or (5).

12. The lubricant according to claim 7, wherein said second perfluoropolyether compound is a compound represented by the formula (7),

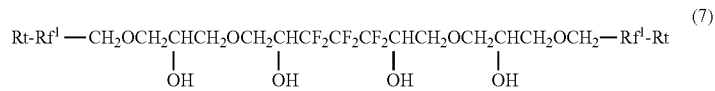
where, $Rf^1$ denotes a perfluoropolyether chain represented by the formula (2) and Rt denotes a terminal group represented by the formula (3).
13. The lubricant according to claim 7, wherein the lubricant consists of the first ingredient and the second ingredient.
* * * * *